United States Patent [19]

Zehle et al.

[11] Patent Number: 5,277,967
[45] Date of Patent: Jan. 11, 1994

[54] MULTILAYER FABRICS

[75] Inventors: Wilhelm Zehle; Hippolit Gstrein, both of Gloggnitz, Austria

[73] Assignee: Huyck Licensco, Inc., Wilmington, Del.

[21] Appl. No.: 979,381

[22] Filed: Nov. 19, 1992

Related U.S. Application Data

[63] Continuation of Ser. No. 795,527, Nov. 21, 1991, abandoned.

[51] Int. Cl.$^5$ .............................................. B32B 5/02
[52] U.S. Cl. ...................................... 428/234; 28/107;
139/383 A; 162/900; 428/212; 428/225;
428/300
[58] Field of Search ............... 162/358; 428/234, 300, 428/212, 225; 28/107; 139/383

[56] References Cited

U.S. PATENT DOCUMENTS

| | | | |
|---|---|---|---|
| 4,425,392 | 1/1984 | Oikawa et al. | 428/234 |
| 4,503,113 | 3/1985 | Smart | 428/234 |
| 4,564,985 | 1/1986 | Tanabe | 428/234 |

Primary Examiner—James J. Bell
Attorney, Agent, or Firm—Lorusso & Loud

[57] ABSTRACT

A base fabric for press felts and a press felt incorporating that base fabric which includes an assembly of three or more separately woven fabric layers. Each of the woven fabric layers making up the base fabric assembly is a single or multilayer fabric, and they may be of the same or different weave patterns. The three or more fabric layers are assembled, one above the other and needled together with at least one batt layer on the papermaking surface of the felt. Preferably, the yarns on the top surface of the top fabric will, by virtue of the weave of the fabric, have long floats in the machine and/or cross machine direction to provide good paper web support. The bottom and intermediate fabric layers may also have long cross machine direction floats on their top surfaces to support the fabric or fabrics above. In a preferred embodiment, the yarns making up the top fabric layer will be relatively finer than those making up the intermediate layer and similarly, the yarns making up the intermediate layer will be relatively finer than those making up the bottom fabric layer.

8 Claims, 3 Drawing Sheets

MULTILAYER FABRICS

This is a continuation of copending application Ser. No. 07/795,527, filed on Nov. 21, 1991, now abandoned.

BACKGROUND OF THE INVENTION

This invention relates to papermakers' fabrics and especially to papermaking felts for the press section of a papermaking machine.

In the conventional fourdrinier papermaking process, a water slurry or suspension of cellulose fibers, known as the paper "stock", is fed onto the top of the upper run of a traveling endless forming belt. The forming belt provides a papermaking surface and operates as a filter to separate the cellulosic fibers from the aqueous medium to form a wet paper web. In forming the paper web, the forming belt serves as a filter element to separate the aqueous medium from the cellulosic fibers by providing for the drainage of the aqueous medium through its mesh openings, also known as drainage holes, by vacuum means or the like located on the drainage side of the fabric.

After leaving the forming medium the somewhat self-supporting paper web is transferred to the press section of the machine and onto a press felt, where still more of its water content is removed by passing it through a series of pressure nips formed by cooperating press rolls, these press rolls serving to compact the web as well.

Subsequently, the paper web is transferred to a dryer section where it is passed about and held in heat transfer relation with a series of heated, generally cylindrical rolls to remove still further amounts of water therefrom.

In general, the press felts in the press section are used in papermaking machinery to support the moist, freshly formed paper web as it encounters a variety of rolls to extract water from the moist paper web. In addition to serving as a support for the moist paper web, the press felt serves as a receptacle for the water removed from the paper sheet. Preferably, the press felts are woven so as to have relatively large open areas or voids which will enhance their water-conveying capabilities until the water is removed from the felt upon passage over a suction box or other drainage device. The press felt normally has a conveyer belt-like shape and during the various operations previously mentioned, a large amount of water is built up in the press felt which is removed by suction or various other drainage devices, usually after the paper web and press felt are no longer in direct contact.

Paper sheet dewatering, sheet surface smoothness, sheet pick-up and sheet carrying, as well as a variety of other performance characteristics, are sensitive to felt design. In addition, it has been observed that the physical characteristics of felts change during their useful operating life. Generally, the originally round or irregularly shaped surface fibers tend to flatten out during operation. As surface fibers flatten, the area of interface between felt and paper increases, leading to greater adhesion between felt and sheet and therefore to improved sheet pickup and sheet carrying performance. In addition, the increased sheet/felt interface area provides a more effective sheet support in the press section leading to more efficient sheet dewatering.

In the press section of the machine, it is also advantageous to remove as much water as possible from the paper web without causing any damage thereto, such as by crushing. Crushing occurs when an excessive amount of water is removed from the paper web, the excessive water then accumulating at the ingoing side of the nip, not carrying through the nip, and moving in a direction counter to that of the moving paper web. Accordingly, care should be taken to ensure that there is sufficient void volume present in the area of the press nip (either in the papermaking fabric or in the press rolls) such that as the paper web undergoes compaction and compression, all of the water expressed therefrom will be carried through the nip.

Therefore, one object of the present invention is to provide an improved papermakers' fabric for use in the press section of the papermaking machine.

Another object of this invention is to provide an improved papermakers' felt having increased void volume and incompressibility for good wear characteristics.

Another object of the present invention is to provide an improved dewatering arrangement in the press section of a papermaking machine wherein relatively large quantities of water may be removed from a paper web without crushing or marring the surface thereof.

A further object of the present invention is to provide means for increasing the amount of water removed from a paper web in the press section of a papermaking machine.

Still another object of the present invention is to provide an improved papermaking press felt which improved water flow and compaction resistance characteristics.

SUMMARY OF THE INVENTION

The present invention is a base fabric for press felts and a press felt incorporating that base fabric which includes an assembly of three or more separately woven fabric layers. Each of the woven fabric layers making up the base fabric assembly is a single or double layer fabric, and the fabric layers may be of the same or different weave patterns. The three or more fabric layers are assembled, one above the other and needled together with at least one batt layer on the papermaking surface of the felt. Preferably, the yarns on the top surface of the top fabric will, by virtue of the weave of the fabric, have long floats in the machine and/or cross machine direction to provide good paper web support. The bottom and intermediate fabric layers may also have long cross machine direction floats on their top surfaces to support the fabric or fabrics above. In a preferred embodiment, the yarns making up the top fabric layer will be relatively finer than those making up the intermediate layer and similarly, the yarns making up the intermediate layer will be relatively finer than those making up the bottom fabric layer.

Additional objects and advantages of this invention, together with a better understanding thereof, may be had by referring to the following detailed description together with the accompanying drawing.

DETAILED DESCRIPTION OF THE INVENTION

Figure 1:
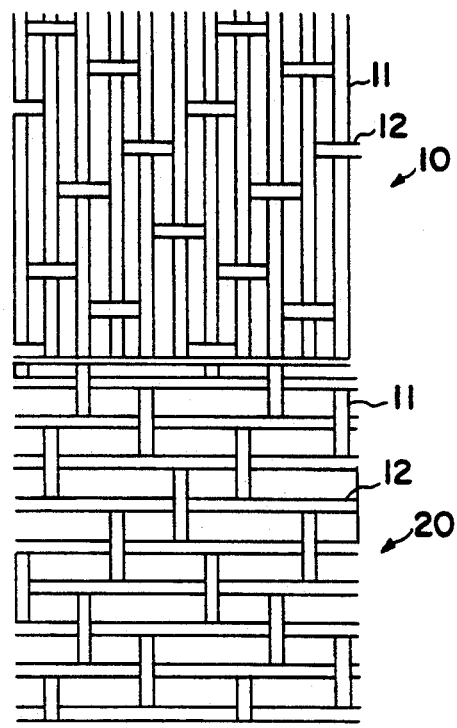
FIG. 1 is a view of one embodiment of a base fabric according to the present invention illustrating the upper and lower surface of the top fabric layer.

The present invention will be described broadly, with a more detailed description following. Described herein is a base fabric for a press felt and a press felt incorporating that base fabric for use in the press section of a papermaking machine, with a base fabric that includes an assembly of at least three fabric layers. The base fabric for the press felt of the present invention will include three or more separately woven fabric layers, each having a top and bottom surface. All of these woven fabric layers may be a single layer fabric, although in some instances, the bottom fabric layer may be a multilayer fabric.

To form the base fabric of the present invention, the fabric layers are positioned one on top of the other. Preferably, the top fabric layer will have long floats in the machine direction or cross machine direction to support the paper web. To form a press felt, at least one batt layer is positioned on the paper sheet-contacting side of the assembled fabric layers, and the batt layer is needled to the assembled fabric layers. The needling process attaches the batt layer to the base fabric assembly, and also joins the assembled fabric layers. In a preferred embodiment, the yarns making up the bottom fabric layer are coarser than those of the intermediate fabric layer and similarly, the yarns making up the fabric of the intermediate fabric layer are coarser than those of the top fabric layer.

The weave designs of the individual fabric layers may be identical or they may be different. The three or more separately woven fabric layers are positioned one on top of the other. Generally, the fabric layer on the side of the press felt which will contact the paper web will have a favorable papermaking surface. In addition, the fabric layer on the side of the press felt which will contact the papermaking machine will have superior wear and abrasion resistant characteristics. It is within the skill of those knowledgeable in the field of art to select weaves for the individual fabric layers to meet the needs of the press felt as required for its anticipated use.

The yarns utilized in each of the fabric layers of the press felt of the present invention will vary, depending upon the desired properties of the final composite press felt. For example, the yarns may be multifilament yarns, monofilament yarns, twisted multifilament and/or monofilament yarns, spun yarns or any combination of the above. It is within the skill of those practicing in the relevant art to select a yarn type, depending on the purpose of the desired press felt, to utilize with the concepts of the present invention.

Yarns selected for use in each of the fabric layers of the base fabric of the press felt of the present invention may be those commonly used in press felt base fabric layers. For example, the yarns could be cotton, wool, polypropylenes, polyesters, aramids or polyamides. Again, one skilled in the relevant art will select a yarn material according to the particular application of the final composite press felt.

In one embodiment of the press felt of the present invention, the intermediate and bottom fabrics making up the base fabrics are woven with long cross machine direction floats on their top surfaces. These long cross machine direction floats serve several purposes. Most importantly, the fiber float serves as a table to support the fabric layer above and to prevent that fabric layer above from collapsing into the fabric layer below that incorporates the long cross machine direction float. By keeping these two fabric layers separate, the unique characteristics of each layer are retained.

Additionally preferred is that the top fabric layer will be woven such that long floats in the machine or cross machine direction are present on its top or papermaking surface. In this manner, the top fabric layer will provide a support for the forming paper web. Furthermore, long floats on the top or papermaking surface improve dewatering by allowing a more uniform pressure transfer between the fabric and the forming paper web.

In a preferred embodiment, the yarns making up the top fabric layer will be finer, i.e. of smaller diameter, than the yarns making up the intermediate fabric layer and the yarns making up the intermediate fabric layer will be finer than the yarns making up the bottom fabric layer. Thus, when the base fabric is assembled, a pyramid effect is achieved. With its coarse yarns the bottom fabric layer provides good compaction resistance, incompressibility, permeability and increased void volume. Since its bottom surface will face the machine, the yarns will have good wear characteristics. The top fabric layer will have the finest yarns, to provide very uniform pressure distribution and a good papermaking surface to support the batt layer. The intermediate fabric layer separates the top and bottom fabric layer and will have characteristics intermediate to those two layers. Again, the long cross machine direction floats on the intermediate and bottom layer serve to support the top and intermediate layers, respectively, and to keep the characteristics of each fabric layer separate. Preferably, the diameter of the yarns in the top fabric layer will range from 0.1 mm–0.4 mm, that of the yarns in the middle fabric layer will range from 0.2 mm–0.5 mm and the diameter of the yarns in the bottom fabric layer will range from 0.4–1.0 mm.

To form a press felt incorporating the base fabric of the present invention, one or more batt layers will be positioned on the assembled fabric layers and subsequently needled thereto. Of course, a layer of batt material will be positioned on the side of the to-be-formed press felt that will contact the paper web. Additionally, one or more layers of batt material may be inserted on the machine-contacting surface of the to-be-formed press felt. The batt material is made up of fibers formed from any of the well known natural or synthetic fibers which are commonly used for this purpose, including such animal fibers as wool and such synthetic fibers as polyacrylics, such as Orlon, polyesters such as Dacron, and polyamids such as Nylon. They are needled to the assembled fabric layers in a conventional manner. In the needling process, the assembled fabric layers are joined together as well.

Figure 2:
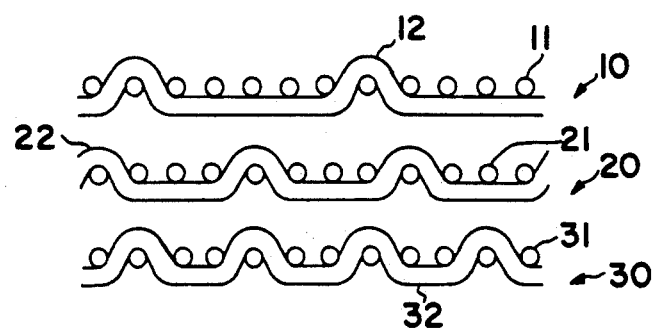
FIG. 2 is a cross machine direction exploded view of the component parts of the embodiment of the base fabric shown in FIG. 1.

The concepts of the present invention are illustrated in the figures. FIGS. 1 and 2 illustrate various views of one embodiment of the base fabric prepared according to the present invention. FIG. 1 shows the upper surface 10 and lower surface 20 of the top fabric layer including interwoven machine direction yarns 11 and cross machine direction yarns 12. The long floats for the machine direction yarns 11 are easily seen in that figure. FIG. 2 shows an exploded sectional view taken in the cross machine direction, illustrating the weave of the individual fabric layers, including the intermediate fabric layer 20 and its interwoven machine direction yarns 21 and cross machine direction yarns 22, and the bottom fabric layer 30, and its interwoven machine direction yarns 31 and cross machine direction yarns 32.

Figure 3:
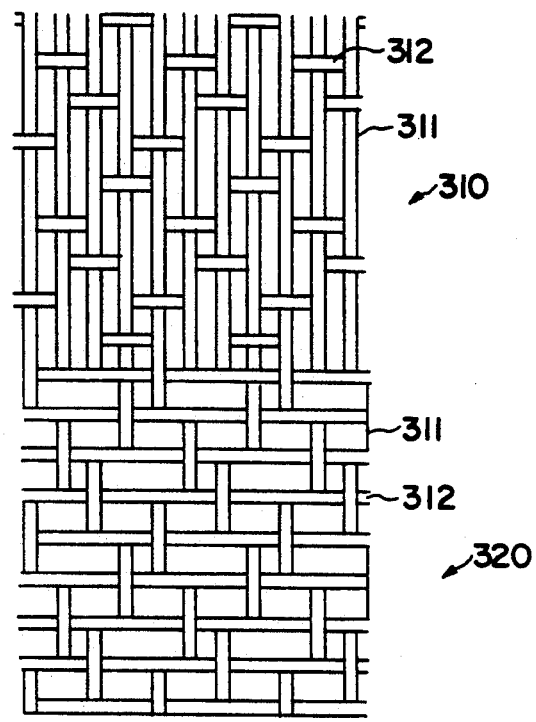
FIG. 3 is a view of another embodiment of a base fabric prepared according to the concepts of the present invention, illustrating the upper and lower surface of the top fabric layer.
Figure 4:
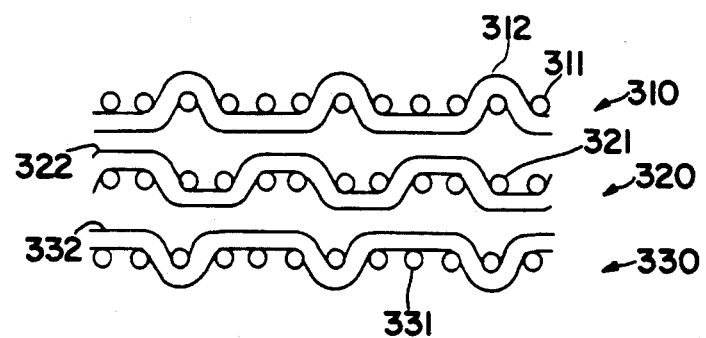
FIG. 4 is a cross machine direction exploded view of the base fabric shown in FIG. 3.

FIGS. 3 and 4 illustrate another embodiment of a base fabric produced according to the present invention. FIG. 3 shows the upper surface of the top fabric layer 310, and the lower surface of the top fabric layer 320. The upper surface of the top fabric layer 310, with its interwoven machine direction yarns 311 and cross machine direction yarns 312, has long floats produced by the machine direction yarns 311 to support the moist paper web. The intermediate fabric layer 320 is a single layer fabric with interwoven machine direction yarns 321 and cross machine direction yarns 322. The bottom fabric layer 330 is a single layer weave with interwoven machine direction 331 and cross machine direction yarns 332.

Figure 5:
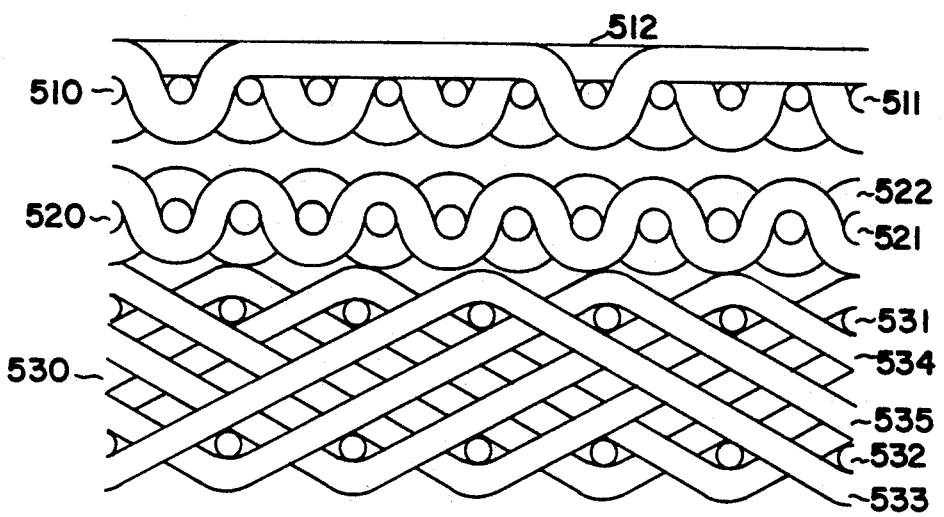
FIG. 5 is a cross machine direction exploded view of yet another embodiment of a base fabric prepared according to the concepts of the present invention.

FIG. 5 illustrates an embodiment of the base fabric of the present invention in which the bottom fabric layer is a multilayer fabric. The upper surface of the top fabric layer 510, with its interwoven machine direction yarns 511 and cross machine direction yarns 512, has long floats produced by the cross machine direction yarns to support the moist paper web. The intermediate fabric layer 520 is a single layer fabric with interwoven machine direction yarns 521 and cross machine direction yarns. The bottom fabric layer 530 is a multilayer layer fabric incorporating interwoven machine direction yarns 531, 532 and cross machine direction yarns 533, 534, 535.

Figure 6:
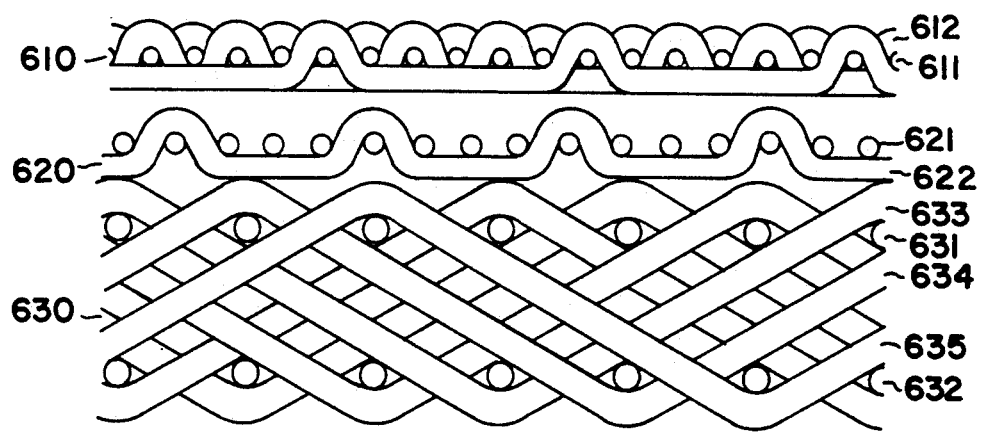
FIG. 6 is a cross machine direction exploded view of still another embodiment of a base fabric prepared according to the concepts of the present invention.

FIG. 6 shows another embodiment of the base fabric of the present invention, with the bottom fabric layer a multilayer fabric, and illustrating a top fabric layer that is finer than the intermediate and bottom fabric layer. The top fabric layer 610 incorporates fine diameter machine direction yarns 611 and cross machine direction yarns 612 interwoven. The intermediate fabric layer 620 is a single layer fabric of interwoven fine diameter machine direction yarns 621 and cross machine direction yarns 622. The bottom fabric layer 630 is a multilayer fabric of coarser diameter yarns than that of the top 610 and intermediate 620 fabric layers, with machine direction yarns 631, 632 and cross machine direction yarns 633, 634, 635.

It is not necessary that all fabric combinations have fabric layers of the base fabric with long floats on their surface. In a preferred embodiment, however, the base fabric will have increasingly longer floats on the individual fabric layer surfaces from the bottom to the top layer. Long floats on the top fabric layer support the moist paper web more efficiently and improve dewatering by more uniform pressure transfer whereas long floats on the bottom fabric-layer control permeability.

Figure 7:
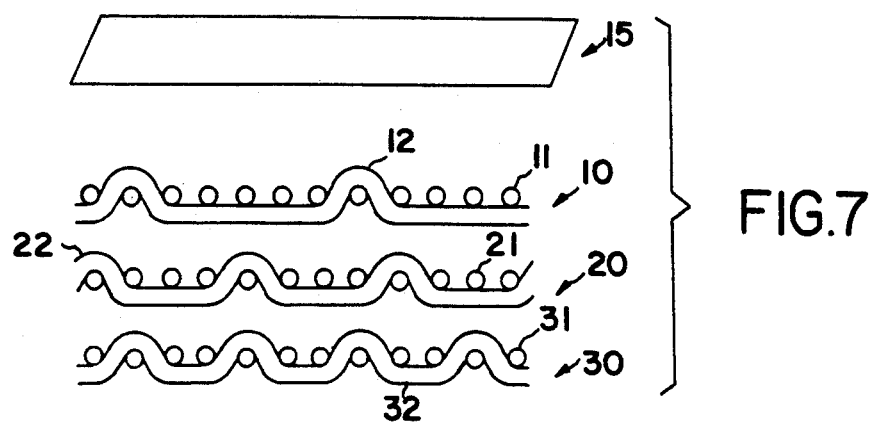
FIG. 7 is a cross machine direction exploded view of a press felt incorporating the base fabric shown in FIGS. 1 and 2.

The base fabric according to the present invention can be incorporated into a press felt for the press section of a papermaking machine. FIG. 7 shows an exploded view of a press felt produced according to the present invention made with the base fabric illustrated in FIGS. 1 and 2. At least one layer of batt material 15 is positioned next to the top surface of the top fabric layer 10 of the assembled fabric layers (which will be the paper sheet contacting side of the finished press felt) and the layer of batt material 15 is needled to the assembled fabric layers. Additionally, one or more layers of batt material may be positioned adjacent to the bottom surface of the bottom fabric layer 30 (which will be the machine contacting side of the finished press felt) and needled thereto. Once positioned as described above, the layer or layers of batt material will be needled thereto in a conventional manner. The needling operation will thus join the assembled fabric layers together, as well as attaching the batt material, to form the press felt as shown in FIG. 7.

It is within the knowledge of one skilled in this art to select the number of and weaves for the fabric layers to be included in a press felt according to concepts of the present invention. The advantages to the press felt described herein is that the different yarn systems facing each other provide more equal pressure support in the press hip. In addition, a better balancing of water flow and compaction resistance is achieved because the fabrics adapt to pressure transfer and porosity more easily. The application of the concept of multiple base fabric layers offers the possibility to select fabric layers to optimize the performance characteristics for the different requirements needed of the felt produced. To ensure a uniform pressure transfer, high water-permeability and good compaction resistance, for example, a dense machine direction oriented top fabric layer with long machine direction floats will be chosen. In addition, a coarser cross machine direction oriented bottom fabric layer will ensure good abrasion resistance and wear resistance of the felt. Moreover, the fact that there are at least three fabric layers ensures a good compaction resistance and increases the permeability of the felt. The use of long machine direction or cross machine direction floats on the top surface of the intermediate and bottom layers provides support and maintains the individual desired characteristics of the separate fabric layers.

While a preferred embodiment of the invention has been described and illustrated, it will be understood that modifications may be made in the invention without departing from its spirit and purpose.

What is claimed is:

1. A press felt for a papermaking machine comprising:
   a base fabric including
   a top fabric layer of at least one set of machine direction yarns and at least one set of cross machine direction yarns interwoven;
   an intermediate fabric layer, positioned between said top fabric layer and a bottom fabric layer, said intermediate fabric layer having at least one set of machine direction yarns and at least one set of cross machine direction yarns interwoven, with no yarns coming from the top fabric layer or going to the top fabric layer; and
   the bottom fabric layer of at least one set of machine direction yarns and at least one set of cross machine direction yarns, interwoven with no yarns going to or coming from the intermediate fabric layer or the top fabric layer;

the top fabric layer, intermediate fabric layer and the bottom fabric layer positioned substantially parallel to each other to form a structure having a top side adjacent the top fabric layer and a bottom side adjacent the bottom fabric layer at least one layer of batt material positioned on the top side of the structure, said top fabric layer, intermediate fabric layer and bottom fabric layer and said at least one layer of batt material joined in a needling operation without any warp or weft yarns interlacing the fabric layers together.

2. The press felt of claim 1 wherein the machine direction yarns and cross machine direction yarns of the top fabric layer are of smaller diameter than the machine direction yarns and cross machine direction yarns of the intermediate fabric layer and the machine direction yarns and cross machine direction yarns of the intermediate fabric layer are of smaller diameter than the machine direction yarns and cross machine direction yarns of the bottom fabric layer.

3. The press felt of claim 1 wherein the top fabric layer in the base fabric has long machine direction or cross machine direction yarn floats on its upper surface.

4. The press felt of claim 1 wherein the intermediate fabric layer and bottom fabric layer in the base fabric have long machine direction or cross machine direction yarn floats on their upper surfaces.

5. The press felt of claim 1 wherein the at least three fabric layers in the base fabric comprise a top fabric layer that is a single layer weave, an intermediate fabric layer that is a single layer weave and a bottom fabric layer that is a multilayer weave including two sets of cross machine direction yarns and machine direction yarns interweaving the two sets of cross machine direction yarns.

6. The press felt of claim 5 wherein the machine direction yarns and cross machine direction yarns of the top fabric layer are of smaller diameter than the machine direction yarns and cross machine direction yarns of the intermediate fabric layer and the machine direction yarns and cross machine direction yarns of the intermediate fabric layer are of smaller diameter than the machine direction yarns and cross machine direction yarns of the bottom fabric layer.

7. The press felt of claim 5 wherein the top fabric layer in the base fabric has long machine direction or cross machine direction yarn floats on its upper surface.

8. The press felt of claim 7 wherein the intermediate fabric layer and bottom fabric layer of the base fabric have long machine direction or cross machine direction yarns floats on their upper surfaces.

* * * * *